United States Patent [19]

Uchikata et al.

[11] Patent Number: 4,709,242

[45] Date of Patent: Nov. 24, 1987

[54] PRINTER

[75] Inventors: Yoshio Uchikata; Mineo Nozaki, both of Kawasaki; Masasumi Nagashima, Yokosuka; Osamu Asakura, Tokyo, all of Japan

[73] Assignee: Canon Kabushiki Kaisha, Tokyo, Japan

[21] Appl. No.: 15,307

[22] Filed: Feb. 17, 1987

Related U.S. Application Data

[63] Continuation of Ser. No. 801,493, Nov. 22, 1985, abandoned, which is a continuation of Ser. No. 750,987, Jul. 1, 1985, abandoned, which is a continuation of Ser. No. 490,159, Apr. 29, 1983, abandoned.

[30] Foreign Application Priority Data

May 7, 1982 [JP] Japan .................................. 57-75110

[51] Int. Cl.[4] .............................................. G01D 15/10

[52] U.S. Cl. ................................ 346/76 PH; 400/356; 400/231

[58] Field of Search ............. 346/76 PH, 76 R, 135.1, 346/105, 106; 355/14 SH; 400/120, 356, 231; 219/216 PH; 250/317.1, 318, 319; 364/518, 519

[56] References Cited

U.S. PATENT DOCUMENTS

| | | | |
|---|---|---|---|
| 3,632,969 | 1/1972 | Walkow | 346/76 PH |
| 3,855,448 | 12/1974 | Hanagata et al. | 346/76 R |
| 3,989,131 | 11/1976 | Knirsch et al. | 346/76 R |
| 4,173,273 | 11/1979 | Hanakata | 346/76 PH |
| 4,387,380 | 6/1983 | Asakura et al. | 346/76 PH |
| 4,404,568 | 9/1983 | Kikuchi et al. | 346/76 PH |

FOREIGN PATENT DOCUMENTS

| | | | |
|---|---|---|---|
| 51-48741 | 12/1976 | Japan | 346/76 PH |
| 54-18605 | 7/1979 | Japan | 346/76 PH |
| 54-160111 | 12/1979 | Japan | 346/76 PH |
| 56-62184 | 5/1981 | Japan | 346/76 PH |
| 58-67472 | 4/1983 | Japan | 346/76 PH |

*Primary Examiner*—Arthur G. Evans
*Attorney, Agent, or Firm*—Fitzpatrick, Cella, Harper & Scinto

[57] ABSTRACT

A thermal transfer printer comprising means for identifying space data present between character data in a print data string. When a space portion is detected by the space identifier, the thermal head is moved apart from the platen of the printer and the ink ribbon feed is stopped thereby preventing the waste of the ink ribbon by the space portion in a line.

46 Claims, 5 Drawing Figures

PRINTER

This is a continuation of application Ser. No. 801,493, filed Nov. 22, 1985, now abandoned, which in turn is a continuation of application Ser. No. 750,987, filed July 1, 1985, now abandoned, which in turn is a continuation of application U.S. Ser. No. 490,159, filed Apr. 29, 1983, now abandoned.

BACKGROUND OF THE INVENTION

1. Field of the Invention

The present invention relates to a thermal transfer type of printer in which the printing is carried out by heating an ink ribbon coated with a heat fusible ink layer to transfer the ink onto a recording paper.

2. Description of Prior Art

The above-mentioned type of printer is well known in the art. For the thermal transfer printer there is often used a reeled ink ribbon. In this case, the ink ribbon is fed from a supply reel and the length of the ink ribbon consumed per line is determined solely by the length of the line from the first printed character to the last one in the line. The feed of ink ribbon is continued even for any short or long blank portion present between characters in the line. An amount of ink ribbon determined by the length of a line is always consumed irrespective as to whether or not the line contains any blank portion (space) between characters. Since the portion of ink ribbon which is fed during the time of a blank is never used to print, the portion of ink ribbon for the blank portion of a line means mere waste of ink ribbon. The amount of ink ribbon wasted in the conventional thermal transfer printer has never been small.

SUMMARY OF THE INVENTION

Accordingly it is an object of the present invention to minimize such waste of ink ribbon in a thermal transfer printer and to attain, at the same time, speed-up of printing by the printer.

It is another object of the present invention to provide a printer in which up-and-down of the head, namely the skipping of the head can be done as many times as desired while minimizing the impact force generated at the time of head-down.

Other and further objects, features and advantages of the invention will appear more fully from the following description taken in connection with the accompanying drawings.

DESCRIPTION OF PREFERRED EMBODIMENT

Figure 1:
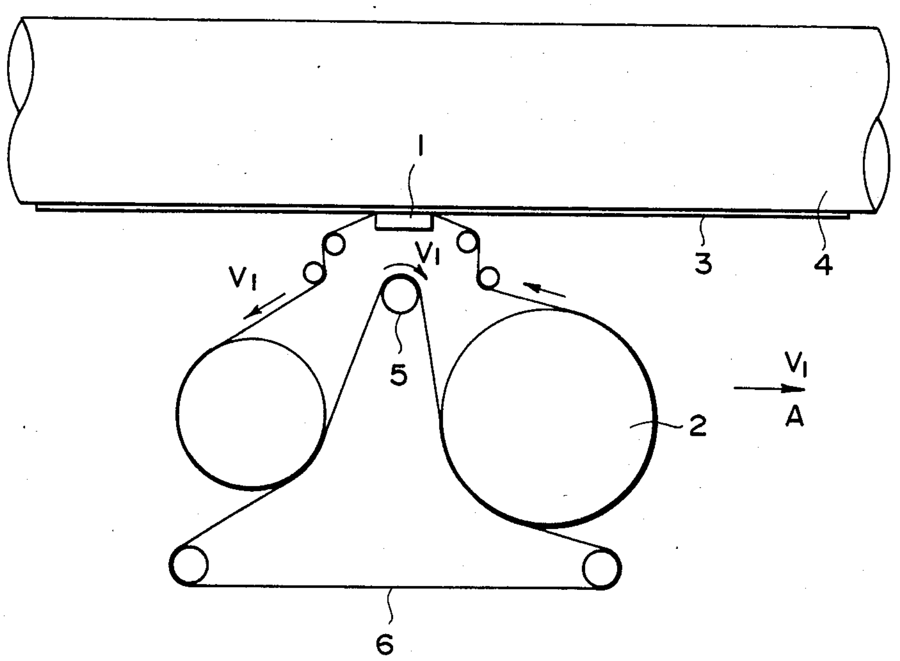
FIG. 1 schematically shows the main part of a thermal transfer printer in which the present invention is embodied.

Referring first to FIG. 1 showing the main part of an embodiment of the invention, the thermal transfer printer includes a thermal head 1 having heating elements. Designated by 2 is an ink ribbon composed of a base film and a heat fusible ink layer coated on the base film. 3 is a recording paper, 4 is a platen of the printer, 5 is a drive shaft for feeding the ink ribbon 2 by a ribbon feed motor RFM (FIG. 3), and 6 is a belt through which the rotation of the drive shaft 5 is transmitted to the ink ribbon 2.

The manner of operation of the above embodiment is as follows:

In printing, the thermal head 1 is pressed against the platen 4 through the ink ribbon 2 and the recording paper 3. The heating elements on the thermal head 1 are selectively heated in accordance with a pattern to be printed. The ink on the ink ribbon 2 is melted by the heat generated from the heating elements and the ink thus melted is then transferred onto the recording paper 3 to effect printing.

Figure 3:
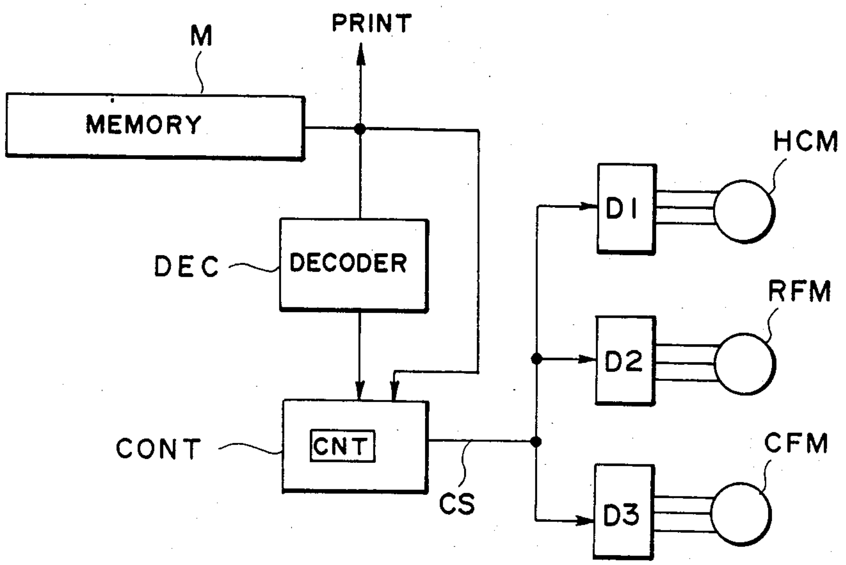
FIG. 3 is a block diagram of the control part of the embodiment.

The thermal head 1 and the ink ribbon 2 are mounted on one and same carriage not shown. For printing on the recording paper by the thermal head and the ink ribbon, the carriage is driven to move in the direction of arrow A at a constant velocity $V_1$. The carriage is driven by a carriage feed motor CFM (FIG. 3). During the printing, the drive shaft 5 rotates at the same speed $V_1$ in the direction of the arrow. The rotating force is transmitted to the ink ribbon 2 through the belt 6 to feed the ink ribbon at the same velocity in the opposite direction to the carriage running direction A as indicated by an arrow. Therefore, the difference in relative speed between the ink ribbon 2 and the recording paper 3 becomes 0 (zero), and the recording paper can be prevented from being made dirty by friction between the ink ribbon 2 and the recording paper 3.

Figure 2:
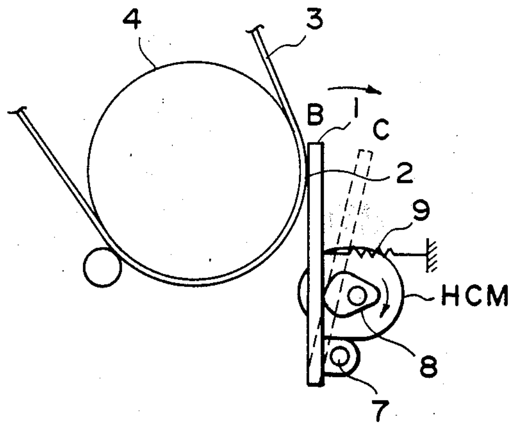
FIG. 2 is a sectional view showing the construction of the thermal head and the platen part of the printer shown in FIG. 1.

FIG. 2 is a sectional view showing the details of a part of the printer including the thermal head and the platen shown in FIG. 1.

In FIG. 2, reference numeral 7 denotes a rotary shaft for supporting the thermal head 1. The supporting shaft 7 is rotatable for rotating the head 1 about it in the direction toward the platen 4 or in the direction away from the platen. 8 is a cam for effecting up-and-down movement of the thermal head 1. Designated by HCM is a head cam motor for rotating the cam 8. 9 is a return spring to normally bias the thermal head 1 against the cam 8.

With the above-described structure of the printer, since the thermal head 1 is normally kept in pressure-contact with the cam 8 by the return spring 9, when the cam 8 is rotated by the head cam motor HCM, the eccentric motion of the cam applies to the thermal head a force against the bias force of the spring 9. As a result, the thermal head 1 is rotated about the shaft 7 in the direction indicated by an arrow. With the rotation of the cam 8, the thermal head 1 moves between positions B and C. In the position B (head-down position), the thermal head 1 is being pressed against the platen 4 through the ink ribbon 2 and the recording paper 3 with a constant pressure to effect printing. At the time of carriage return or skip, the thermal head is returned to the position C (head-up position).

Even when the cam 8 is rotated at a uniform speed, the motion of the thermal head 1 can be variously determined by suitably selecting the contour of the cam 8. The impact force at the head-down also can be minimized by selecting the most suitable contour of the cam 8 for soft landing of the thermal head onto the platen 4. By doing so, the problem that the recording paper 3 is made dirty by a strong impact at every head-down can be eliminated.

The construction and operation of the control part of the embodiment will hereinafter be described with reference to FIG. 3.

Figure 4:
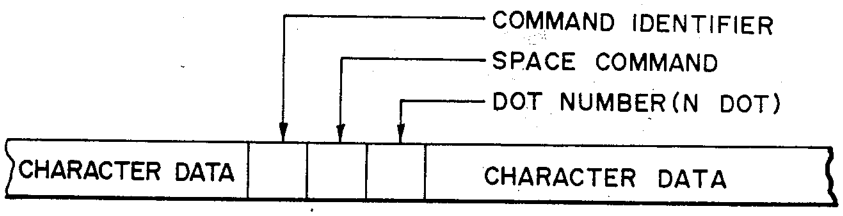
FIG. 4 illustrates an example of the print data string input to the thermal transfer printer according to the invention.

In FIG. 3, M is a memory in which data to be printed are stored in the form of a character data string as shown in FIG. 4. The memory M may be a shift register of a random access memory (RAM). When RAM is used, the stored data are read out in time-series from the memory by a print command as a matter of course. DEC is a decoder which serves as a detection circuit for detecting the presence of space code. CONT is a control circuit controller having a counter CNT incorporated therein to store the number of space codes. In its initial state, the counter CNT is set to 0 (zero). After a command, identifier and a space command as shown in FIG. 4, have been detected by the decoder DEC, the number of the following space dots are set in the counter CNT. In response to the content value of the counter CNT, the control circuit CONT generates the corresponding control signals CS1, CS2, CS3 until the content of the counter CNT is decreased to 0 by the control circuit CONT which decrements the content of the counter at a rate of $-1$ per unit time (time required for the head to move one dot). D1, D2, D3 are drivers which operate in response to the control signals CS1, CS2, CS3 from the control circuit CONT respectively.

In response to the input control signal CS1 the driver D1 interrupts the power supply to the head cam motor HCM. In response to the input control signal CS2 the driver D2 interrupts the power supply to the ribbon feed motor RFM. In response to the input control signal CS3 the driver D3 changes over the driving voltage of the carriage feed motor CFM, changes over the rotational direction of the motor and stops the motor.

In FIG. 3, the control circuit CONT and the drivers D1, D2, D3 are connected through a common signal line. However, it is to be understood that the control circuit and the drivers may be connected through separate signal lines.

Figure 5:
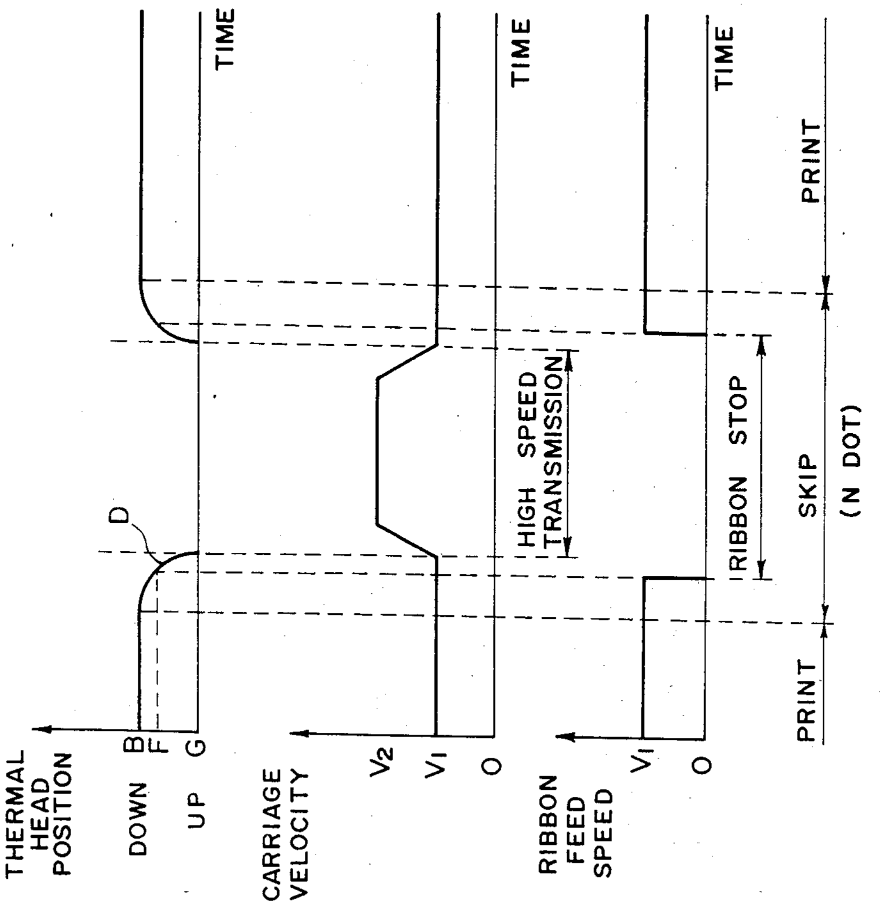
FIG. 5 is a timing chart showing the time relation between thermal head position, carriage velocity and ribbon feed speed for the case where the printing is carried out with the input of a print data string as shown in FIG. 4.

The controller CONT controls the printing operation in the manner as shown in FIG. 5.

When a space command is detected, the controller drives the head cam motor HCM for a certain determined time. At the time point at which the thermal head 1 has just been moved up to F, the controller cuts off the power supply to the ribbon feed motor RFM. When the head has been moved up further to the position C, the controller changes up the driving voltage of the carriage feed motor CFM from $V_1$ to $V_2$ to move the carriage at a higher speed. A certain number of dots before the end of a skip, the controller changes down the driving voltage of the motor CFM from $V_2$ and $V_1$ and at the same time it drives the head cam motor HCM in the reverse direction to make the thermal head 1 contact the platen 4 softly and smoothly without impact. When the head 1 reaches the position F, the controller drives the motor RFM to start feeding the ribbon.

FIG. 4 illustrates an example of the print data string to be input to the above-described thermal transfer printer.

The print data string shown in FIG. 4 includes a blank (space) between character data, and data representing the number of dots of the blank. The latter mentioned data is constituted of a command identifier for discriminating command from character data, space command for indicating the presence of a blank (space) and data indicative of the number of dots of the blank.

When the print data string shown in FIG. 4 is input to the printer described above, the printing operation of the printer is controlled in the manner as shown in FIG. 5. The manner of the printing operation will be described below with reference to FIG. 5 which is a timing chart showing the time relation between the position of the thermal head, the velocity of the carriage and the feed speed of the ink ribbon 2.

During printing, the thermal head 1 is in its head-down position B (see FIG. 2) and being pressed against the platen 4 through the ink ribbon 2 and the recording paper 3 by a constant pressure. The carriage having the thermal head 1 and the ink ribbon 2 mounted thereon is also running at a uniform velocity of $V_1$. At the same time, the ink ribbon 2 is fed at the same ribbon feed speed of $V_1$. Therefore, during this phase of printing, the difference in relative velocity between the ink ribbon 2 and the recording paper 3 is 0 (zero). The heating elements of the thermal head 1 are selectively and successively heated in accordance with the character data shown in FIG. 4. Thus, ink is transferred onto the recording paper 3 from the ink ribbon 2. In this manner, printing is effected.

If any blank (space) data is present in a print data string as in the case of FIG. 4, the cam 8 which is driven by means of control signal CS1 as previously noted, is rotated by the head cam motor HCM when the character data directly before the blank has been printed. With the rotation of the cam 8, the thermal head 1 is moved up and apart from platen 4. The curve D in FIG. 5 shows the slope which the head 1 describes during this head-up step. The slope D is directly determined by the contour of the cam 8. At this head-up step, the running of the carriage and the ribbon feed are continued at the same speed $V_1$ as that for printing until the thermal head 1 is moved up to a predetermined position F somewhat away from the recording paper 3 (therefore from the platen 4). When the thermal head 1 reaches the position F, the ribbon feed is stopped by a control signal CS2 from the controller at once. A short time after the stop of ribbon feed, the running speed of the carriage is increased up to $V_2$ and the carriage gets in the state of high speed running. In the timing chart shown in FIG. 5, the time point at which the change-up of the carriage running speed to $V_2$ is shown to be the time point at which the thermal head 1 has just reached the position C (see FIG. 2). However, of course, the stop of ribbon feed and the change-up of carriage running speed to $V_2$ may be done at the same time when the thermal head 1 has just been moved up to the position F.

With a further rotation of the cam 8 the thermal head 1 is further moved up to the return position C. At this time point, the power supply to the motor HCM is stopped by a control signal CS1. Also, in response to a control signal CS3 from the controller, the carriage feed motor CFM drives the carriage at the increased carriage speed $V_2$ for a determined time corresponding to the number of dots of the blank (space). After the high speed running of the carriage for the determined time, the running speed of the carriage is again changed down to $V_1$ in accordance with the control signal CS3. At the time point at which the carriage speed actually becomes $V_1$, the cam 8 is rotated by the control signal CS1 to move the thermal head 1 down. When the thermal head 1 is moved down to the determined position F, the feeding of the ink ribbon 2 is restarted by the control signal CS2. The thermal head 1 is further moved down simultaneously with the running of the carriage. The thermal head 1 reaches the position B (printing position) when the carriage has just moved a distance corresponding to the number of dots of the space in the print data string (that is, when the skipping operation of the carriage has just been completed). Thereafter, the printer again carries out printing in accordance with the input character data.

As readily understood from the foregoing, the printer according to the invention has many advantages over the prior art ones. According to the invention, the thermal head is moved up and the ribon feed is stopped for any blank (space) present in a line. This eliminates the problem of the ink ribbon being uselessly consumed by any blank portion in a line. Such waste of the ink ribbon has been inevitable in the printers according to the prior art. Further, according to the invention, there is used such print data string which additionally contains data informing of the presence of blank (space) between character data as well as the number of dots of the blank. Since the printer is controlled by the print data string, up-and-down of the thermal head and skipping of the carriage can be done as many times as required in the course of one line printing. Another advantage of the printer according to the invention is found in that the impact caused by the head-down is minimized and therefore the recording paper can well be prevented from being made dirty by any strong impact at the time of head-down which problem has been often observed in the printer of the prior art.

While the invention has been particularly shown and described with reference to a preferred embodiment thereof, it will be understood by those skilled in the art that various changes and modifications may be made therein without departing from the spirit and scope of the invention.

What we claim is:

1. A printer having a carriage carrying thereon a head and an ink ribbon, capable of feeding said ink ribbon in a direction opposite to the running direction of said carriage and transferring the ink of said ink ribbon to a recording sheet in accordance with data that includes character information to be supplied to said head, said printer comprising:

means for separating said head from a platen of the printer, said head separating means including cam means;

identifying means for identifying sapce information, also included in the data, between the character information; and control means for effecting said head's separation from the platen and stoppage of said ink ribbon feed for the space detected by said identifying means.

2. A printer as set forth in claim 1, further comprising a motor for driving said cam means.

3. A printer as set forth in claim 1, wherein said identifying means comprises decoder means.

4. A printer as set forth in claim 1, wherein said control means comprises memory means for storing therein information indicative of the space information.

5. A printer as set forth in claim 4, wherein said control means comprises means for decrementing the information stored in said memory means.

6. In a thermal transfer printer of the type which has a carriage carrying thereon a thermal head and an ink ribbon coated with an ink layer fusible under the action of said heat to transfer the ink to a recording sheet in accordance with data that includes character information to be supplied to said head, said ink ribbon being fed, when said carriage is driven to move in a running direction, at the same speed as the running speed of said carriage but in the opposite direction to the running direction of said carriage, the printer comprising:

means for applying to said thermal head a bias force intending to move said head in a direction away from a platen of the printer;

head moving means for softly and smoothly pressing said head to said platen against the bias force;

identifying means for identifying space information, also included in the data, between the character information, the sapce information being indicative of the duration of a space between characters;

first controlling means for controlling the operation of said head moving means;

second controlling means for controlling the ink ribbon feed; and third controlling means for controlling the running speed of said carriage, whereby dependent upon the duration of the space detected by said identifying means, said thermal head is moved apart from the platen, the ink ribbon feed is stopped and said carriage is driven at a higher speed.

7. A printer comprising:

an ink ribbon;

a thermal head for transferring the ink of said ink ribbon to a recording sheet in accordance with data that includes first information to be supplied to said thermal head, said thermal head and the recording sheet being mounted for relative movement;

conveying means for conveying said ink ribbon;

driving means for selectively bringing said thermal hea dand said ink ribbon into an operating state wherein they abut each other and into a non-operating state wherein they are separated from each other;

identifying means for identifying second information, also included in the data, that determines whether or not said thermal head and said ink ribbon are to be separated;

memory means for memorizing the information identified by said identifying means; and control means for controlling said conveying means and said driving means to separate said thermal head and said ink ribbon and to inhibit conveying of said ink ribbon for a duration in accordance with the information memorized by said memory means.

8. A printer as set forth in claim 7, wherein said driving means includes a cam.

9. A printer as set forth in claim 8, further comprising a motor for driving said cam.

10. A printer as set forth in claim 7, further comprising moving means for relatively moving said thermal head and the recording sheet a higher speed than the speed it is moved for printing after said thermal head has been separated from the said ink ribbon.

11. A printer according to claim 7, wherein the first information is character information.

12. A printer according to claim 11, wherein the second information is provided between character information.

13. A printer according to claim 7, wherein the second information indicates a space.

14. A printer according to claim 7, wherein said identifying means includes a decoder.

15. A printer according to claim 7, wherein said control means includes subtracting means for performing a subtraction operation on the information stored in said memory means.

16. A printer comprising:

an ink ribbon;

a thermal head for transferring the ink of said ink ribbon to a recording sheet in accordance with data that includes first information to be supplied to said thermal head, said thermal head being mounted for movement along the recording sheet;

conveying means for conveying said ink ribbon;

moving means for moving said thermal head along with said recording sheet;

driving means for selectively bringing said thermal head and said ink ribbon into an operating state wherein they abut each other and into a non-operating state where they are separated from each other;

identifying means for identifying second information that determines whether or not said thermal head and said ink ribbon are to be separated; and control means for controlling said conveying means, said moving means and said driving means in accordance with the identification of information by said identifying means to separate said thermal head and said ink ribbon, to inhibit conveying of said ink ribbon and to increase the speed at which said moving means moves said thermal head for a duration in accordance with the information identified by said identifying means.

17. A printer according to claim 16, wherein the first information is character information.

18. A printer according to claim 17, wherein the second information is provided between character information.

19. A printer according to claim 16, wherein the second information indicates a space.

20. A printer according to claim 16, wherein said identifying means includes a decoder.

21. A printer comprising:

an ink ribbon;

a thermal head for transferring the ink of said ink ribbon to a recording sheet in accordance with data that includes first information to be supplied to said thermal head, said thermal head and the recording sheet being mounted for relative movement;

conveying means for conveying said ink ribbon;

driving means for selectively driving said thermal head between an operating position wherein said thermal head abuts said ink ribbon and a retracted position wherein said thermal head is retracted from said operating position, said driving means providing for softly bringing said thermal head into abutment with said ink ribbon;

identifying means for identifying second information, also included in the data, that determines whether or not said thermal head is to be separated from said ink ribbon; and control means for controlling said conveying means and said driving means to separate said thermal head from said ink ribbon and to inhibit conveying of said ink ribbon for a duration in accordance with the information identified by said identifying means.

22. A printer according to claim 21, wherein the first information is character information.

23. A printer according to claim 22, wherein the second information is provided between character information.

24. A printer according to claim 21, wherein the second information indicates a space.

25. A printer according to claim 21, wherein said identifying means includes a decoder.

26. A printer according to claim 21, wherein said driving means includes a cam.

27. A printer according to claim 21, wherein said driving means includes a spring.

28. A printer comprising:

an ink ribbon;

a thermal head for transferring the ink of said ink ribbon to a recording sheet in accordance with data that includes first information to be supplied to said thermal head, said thermal head being mounted for movement along the recording sheet;

conveying means for conveying said ink ribbon;

moving means for moving said thermal head along said recording sheet;

driving means for selectively driving said thermal head between an operating position wherein said thermal head abuts said ink ribbon and a retracted position wherein said thermal head is retracted from said operating position, said driving means providing for softly bringing said thermal head into abutment with said ink ribbon;

identifying means for identifying second information, also included in the data, that determines whether or not said thermal head is to be separated from said ink ribbon; and control means for controlling said conveying means, said moving means and said driving means in accordance with the identification of information by said identifying means to separate said thermal head and said ink ribbon, to inhibit conveying of said ink ribbon and to increase the speed at which said moving means moves said thermal head for a duration in accordance with the information identified by said identifying means.

29. A printer according to claim 28, wherein the first information is character information.

30. A printer according to claim 29, wherein the second information is provided between character information.

31. A printer according claim 28, wherein the second information indicates a space.

32. A printer according to claim 28, wherein said identifying means includes a decoder.

33. A printer according to claim 28, wherein said driving means includes a cam.

34. A printer according to claim 28, wherein said driving means includes a spring.

35. A printer comprising:

an ink ribbon;

a thermal head for transferring the ink of said ink ribbon to a recording sheet in accordance with data that includes first information to be supplied to said thermal head, said thermal head and the recording sheet being mounted for relative movement;

conveying means for conveying said ink ribbon;

moving means for moving said thermal head between a record-operating position wherein said thermal head presses a platen through the recording sheet and said ink ribbon and a retracted position wherein said thermal head is retracted from the record-operating position;

identifying means for identifying second information, also included in the data, that determines whether or not said thermal head is to be moved;

memory means for memorizing the second information; and control means for controlling said conveying means and said moving means to move said thermal head to the retracted position and to inhibit conveying of said ink ribbon for a duration in accordance with the information memorized by said memory means.

36. A printer according to claim 35, wherein the first information is character information.

37. A printer according to claim 36, wherein the second information is provided between character information.

38. A printer according to claim 35, wherein the second information indicates a space.

39. A printer comprising:

an ink ribbon;

a thermal head for transferring the ink of said ink ribbon to a recording sheet in accordance with data that includes first information to be supplied to said thermal head, said thermal head and the recording sheet being mounted for relative movement;

conveying means for conveying said ink ribbon;

moving means for moving said thermal head between a record-operating position wherein said thermal head presses a platen through the recording sheet and said ink ribbon and a retracted position wherein said thermal head is retracted from the record-operating position;

identifying means for identifying second information, also included in the data, that determines whether or not said thermal head is to be moved;

memory means for memorizing the second information; and control means for controlling said conveying means and said moving means to move said thermal head to the retracted position and to inhibit conveying of said ink ribbon and to increase the speed of said thermal head in the retracted position for a duration in accordance with the information memorized by said memory means.

40. A printer according to claim 39, wherein the first information is character information.

41. A printer according to claim 36, wherein the second information is provided between character information.

42. A printer according to claim 39, wherein the second information indicates a space.

43. A printer comprising:

an ink ribbon;

a thermal head for transferring the ink of said ink ribbon to a recording sheet in accordance with data that includes first information to be supplied to said thermal head, said thermal head and the recording sheet being mounted for relative movement;

conveying means for conveying said ink ribbon;

moving means for moving said thermal head between a record-operating position wherein said thermal head is softly pressed against a platen through the recording sheet and said ink ribbon and a retracted position wherein said thermal head is retracted from the record-operating position;

identifying means for identifying second information, also included in the data, that determines whether or not said thermal head is to be moved;

memory means for memorizing said second information; and control means for controlling said conveying means and said moving means to move said thermal head to the retracted position and to inhibit conveying of said ink ribbon for a duration in accordance with the information memorized by said memory means.

44. A printer according to claim 33, wherein the first information is character information.

45. A printer according to claim 44, wherein the second information is provided between character information.

46. A printer according to claim 33, wherein the second information indicates a space.

* * * * *

UNITED STATES PATENT AND TRADEMARK OFFICE
CERTIFICATE OF CORRECTION

PATENT NO. : 4,709,242

DATED : November 24, 1987

INVENTOR(S) : YOSHIO UCHIKATA, ET AL.

It is certified that error appears in the above-identified patent and that said Letters Patent is hereby corrected as shown below:

COLUMN 3

Line 19, "command, identifier and a space command" should read --command identifier and a space command,--.

COLUMN 5

Line 14, "ribon" should read --ribbon--.

COLUMN 6

Line 2, "heat" should read --head--.
Line 16, "sapce" should read --space--.
Line 37, "hea dand" should read --head and--.

COLUMN 7

Line 20, "where" should read --wherein--.

COLUMN 8

Line 49, "according claim" should read --according to claim--.

UNITED STATES PATENT AND TRADEMARK OFFICE
CERTIFICATE OF CORRECTION

PATENT NO. : 4,709,242

DATED : November 24, 1987

INVENTOR(S) : YOSHIO UCHIKATA, ET AL.

It is certified that error appears in the above-identified patent and that said Letters Patent is hereby corrected as shown below:

COLUMN 10

Line 6, "claim 36," should read --claim 40,--.
Line 35, "claim 33," should read --claim 43,--.
Line 40, "claim 33," should read --claim 43,--.

Signed and Sealed this

Seventeenth Day of May, 1988

*Attest:*

DONALD J. QUIGG

*Attesting Officer*

*Commissioner of Patents and Trademarks*